Patented May 23, 1950

2,508,617

UNITED STATES PATENT OFFICE 2,508,617

COLORED LUBRICATING OIL

Robert G. Mastin, Okmulgee, Okla., assignor to Cities Service Oil Company, Bartlesville, Okla., a corporation of Delaware No Drawing. Application April 2, 1947,
Serial No. 738,934

6 Claims. (Cl. 252—50)

My invention relates to a mineral lubricating oil of improved color and to a method for imparting green fluorescence to lubricating oils normally devoid of a distinctive color of this type.

One of the important characteristics of a high-grade petroleum lubricating oil stock is the possession of an attractive green fluorescence. Some of these stocks in the paler colors have a rich golden appearance, and in transmitted light a distinctive green fluorescence. Considering the large scale production of lubricating oil stocks, a considerable proportion of such stocks do not have a distinctive green fluorescence, but on the other hand, possess what is generally known in the art as bluish bloom, which is very noticeable in some highly refined oils. While such a stock may have the required physical and chemical properties as a lubricant, they, nevertheless, must be graded as something less than a premium stock because of poor color.

The primary object of my invention is therefore to convert a mineral lubricating oil stock, normally devoid of a distinctive green fluorescence or which has a noticeable bluish bloom, into a stock which has a very attractive green fluorescence.

A further object of my invention is to provide a mineral lubricating oil composition having a distinctive green fluorescence.

In accordance with the features of my invention, I have discovered that oils of poor color may be changed so that they will have a distinctive green fluorescence by mixing therewith certain derivatives of phenylhydrazine, and more particularly the reaction products of phenylhydrazine and certain phenyl ketones in which the phenyl group has an attached hydrocarbon chain containing one or more double bonds between carbons in the chain.

As a specific example, I have found that the reaction product of phenylhydrazine and dianisalacetone has the unique property of imparting a green fluorescence to petroleum lubricating oil stocks which are normally unattractive or which have a bluish bloom. Extremely small proportions of this color improver are adequate to give the distinctive desired color. In most cases I have found that from 0.001% to 1.0%, depending upon the depth or degree of coloration desired, is adequate for almost any oil. A light neutral oil having a bluish bloom, as I have found, requires only about 0.001% of the color improver in order to impart a distinctive fluorescent green color to the oil. On the other hand, a heavy bright stock may require from 0.01% to 0.05% or more of the color material.

The reaction product of dianisalacetone and phenylhydrazine, as referred to above, is believed to have the following structural formula

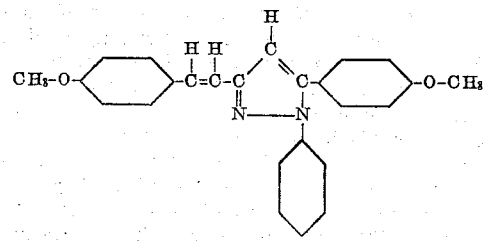

This product is a pyrazole derivative because it contains the pyrazole ring known to be obtainable in certain instances by reacting certain compounds with phenylhydrazine, and may be called 1-phenyl- 3 -(p-methoxystyryl) - 5 -(p-methoxyphenyl) pyrazole.

I have prepared the foregoing compound by reacting 29.4 parts by weight of dianisalacetone with 10.8 parts by weight of phenylhydrazine in 60 parts by weight of acetic acid. This mixture was heated at 100° C. for 5 minutes, cooled and then diluted with a small amount of ethyl acetate. The yellow leaflets of the desired compound are formed in the solution and filtered out. The product was purified by recrystallization in ethyl acetate, and had a melting point of 159° C. The yield was about 90% of theoretical.

Since such small proportions of the compound are used for coloring mineral lubricating oils, it is not entirely necessary to purify the product to any great extent. Furthermore, according to the structure given above, it will be noted that the reaction closed or formed the pyrazole ring. A portion of the reaction product may include one or more compounds in which the ring is not formed but in which the hydrazine is connected up to the radicals of the dianisalacetone.

Other reaction products which I have found to impart a distinctive green fluorescence to lubricating oil stocks are 1-phenyl-3-(b-styrylvinyl)-5-(p-methoxyphenyl) pyrazole and dicinnamalacetone phenyl hydrazone.

The first of these compounds was the primary reaction product of anisalcinnamalacetone and phenylhydrazine, and is prepared by mixing 29 parts by weight of the former with 10.8 parts by weight of the latter in 60 parts by weight of acetic acid. This mixture is warmed and then diluted with approximately 80 parts by weight of ethyl alcohol. The mixture after cooling is allowed to stand 3 or 4 hours and is then filtered to yield a yellow crystal product, which was recrystallized from hot ethyl alcohol and had a melting point of 155–156° C. The yield was 85–95% of theoretical, and the structural formula is

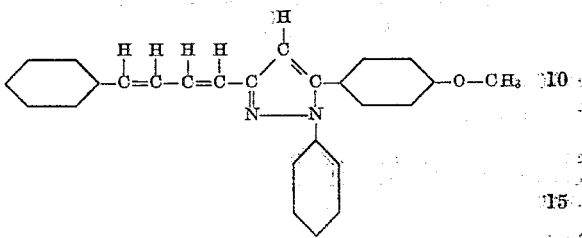

It will be noted that in this instance the principal product of the reaction includes the pyrazole ring, although it is to be understood that the crude product which may be used as the coloring material may include constituents in which the phenylhydrazine is connected to the anisalcinnamal radicals without the closed pyrazole ring.

The last compound referred to above was prepared by reacting 28.6 parts by weight of dicinnamalacetone with 10.8 parts by weight of phenylhydrazine in 60 parts by weight of acetic acid. The mixture was warmed to effect the reaction and thereafter cooled and diluted with approximately 80 parts by weight of ethyl alcohol. The resulting product which crystallized out was filtered and then recrystallized from hot ethyl alcohol. The melting point was 166° C. and the yield was about 90% of theoretical. The structural formula of the compound, that is, dicinnamalacetone phenylhydrazone is

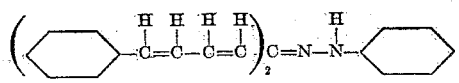

It will be noted that this product of the reaction does not include the closed pyrazole ring, although the crude reaction product may contain an appreciable quantity of a constituent in which the ring is formed as in the case of the pyrazoles referred to above.

All of these compounds are reaction products of aromatic ketones, particularly acetones containing radicals of the type of anisal and cinnamal, and phenylhydrazine. It will be noted that as shown by the structures of the various compounds that they all contain two or more phenyl groups, one of which if attached to a chain of two nitrogen atoms, the terminal N of which is connected by a double bond with a carbon atom in the compound.

What I claim as new is:

1. A petroleum lubricating oil stock containing a small proportion sufficient to impart a greenish fluorescence to the oil stock of a product obtained by reacting phenylhydrazine at a temperature of about 100° C. with an approximately equimolar quantity of a reagent selected from the group consisting of dianisalacetone, anisalcinnimalacetone, and dicinnimalacetone, in acetic acid solution.

2. A petroleum lubricating oil stock containing a small proportion sufficient to impart a greenish fluorescence to the oil stock of a reaction product obtained by dissolving approximately equimolar quantities of phenylhydrazine and a reagent selected from the group consisting of dianisalacetone, anisalcinnimalacetone, and dicinnimalacetone in acetic acid, reacting the mixture at a temperature of about 100° C., diluting the solution with a diluent selected from the group consisting of ethyl acetate and ethyl alcohol, and recovering the reaction product.

3. A petroleum lubricating oil stock as defined in claim 2 in which the reagent is anisalcinnimalacetone and the diluent is ethyl alcohol.

4. A petroleum lubricating oil stock containing a small proportion sufficient to impart a greenish fluorescence to the oil stock of a product obtained by reacting phenylhydrazine at about 100° C. with an approximately equimolar quantity of dianisalacetone in acetic acid solution.

5. A petroleum lubricating oil stock containing a small proportion sufficient to impart a greenish fluorescence to the oil stock of a product obtained by reacting phenylhydrazine at about 100° C. with an approximately equimolar quantity of anisalcinnimalacetone in acetic acid solution.

6. A petroleum lubricating oil stock containing a small proportion sufficient to impart a greenish fluorescence to the oil stock of a product obtained by reacting phenylhydrazine at about 100° C. with an approximately equimolar quantity of dicinnimalacetone in acetic acid solution.

ROBERT G. MASTIN.

REFERENCES CITED

The following references are of record in the file of this patent:

UNITED STATES PATENTS

| Number | Name | Date |
| --- | --- | --- |
| 1,860,850 | Cassidy | May 31, 1932 |
| 1,878,557 | Wahl | Sept. 20, 1932 |
| 1,962,564 | Kuhrman | June 12, 1934 |
| 2,017,815 | Johnston | Oct. 15, 1935 |
| 2,420,446 | Rocchini | May 13, 1947 |
| 2,454,075 | Mastin | Nov. 16, 1948 |

OTHER REFERENCES

Manufacture of Organic Dyestuffs, by Wahl; Bell and Sons, Ltd., London, 1914, pages 129 and 130 pertinent.